United States Patent
Gratzer (10) Patent No.: US 10,232,934 B2
(45) Date of Patent: Mar. 19, 2019

(54) WING TIP WITH OPTIMUM LOADING

(71) Applicant: Aviation Partners, Inc., Seattle, WA (US)

(72) Inventor: Louis B. Gratzer, Seattle, WA (US)

(73) Assignee: Aviation Partners, Inc., Seattle, WA (US)

( * ) Notice: Subject to any disclaimer, the term of this patent is extended or adjusted under 35 U.S.C. 154(b) by 522 days.

(21) Appl. No.: 15/148,922

(22) Filed: May 6, 2016

(65) Prior Publication Data

US 2017/0057622 A1    Mar. 2, 2017

Related U.S. Application Data

(63) Continuation of application No. 12/488,488, filed on Jun. 19, 2009, now Pat. No. 9,381,999.

(60) Provisional application No. 61/074,395, filed on Jun. 20, 2008.

(51) Int. Cl.
  *B64C 23/06*    (2006.01)
  *B64C 11/18*    (2006.01)
  *B64C 27/46*    (2006.01)
  *B64C 3/10*     (2006.01)

(52) U.S. Cl.
  CPC ............. *B64C 23/069* (2017.05); *B64C 3/10* (2013.01); *B64C 11/18* (2013.01); *B64C 27/463* (2013.01); *Y02T 50/164* (2013.01)

(58) Field of Classification Search
  CPC .. B64C 3/10; B64C 3/14; B64C 11/18; B64C 23/065; B64C 23/069; B64C 27/463
  See application file for complete search history.

(56) References Cited

U.S. PATENT DOCUMENTS 5,174,721 A  * 12/1992  Brocklehurst ........ B64C 27/463
                                                416/223 R
6,231,308 B1 *  5/2001  Kondo .................. B64C 27/463
                                                416/228
6,484,968 B2 * 11/2002  Felker .................. B64C 23/069
                                                244/199.4

* cited by examiner

Primary Examiner — Nicholas McFall
(74) Attorney, Agent, or Firm — Rutan & Tucker, LLP (57) ABSTRACT

A wing tip designed for attachment to a winglet of an aircraft, the winglet coupled to a wing of the aircraft and having a leading edge and a trailing edge continuously transitioning from a leading edge and trailing edge of the wing. The wing tip may include a curved leading edge from the winglet leading edge to a leading end point, a curved trailing edge from a winglet trailing edge to a trailing end point, and an end segment connecting the leading end point and the trailing end point. The end segment may be swept back from the trailing end point to the leading end point at an end segment angle.

12 Claims, 7 Drawing Sheets

WING TIP WITH OPTIMUM LOADING

PRIORITY

This application is a continuation of U.S. patent application Ser. No. 12/488,488, filed Jun. 19, 2009, which claims priority to U.S. Provisional Patent Application No. 61/074,395, filed Jun. 20, 2008, each of which is incorporated by reference in its entirety into this application.

BACKGROUND

All aircraft wings experience drag as they move through the air. The experienced drag may be separated into three components: induced drag, parasitic drag, and compressibility drag. Induced drag depends on the lift force carried by the lifting surfaces. Parasitic drag arises from contact between a moving surface and the fluid and includes such factors as the object form, skin friction, and interference factors. Compressibility drag is the drag associated with higher Mach numbers, which may include viscous and vortex drag, shock-wave drag, and any drag due to shock-induced separations, all of which may vary with Mach number. Of these, the induced drag has traditionally shown the greatest potential for improvement through the use of winglets or other wing tip devices.

Generally, an aircraft's wing may be swept to reduce drag effects on high-speed airplanes. A swept wing is generally designed so the angle between the aircraft's body and the wing is oblique, and specifically is swept toward the aft of the aircraft. The sweep of the wing's leading edge and trailing edge does not necessarily have to be at the same angle. A wing tip device may also be added to further reduce the drag on the wing. One alternative is to provide a raked wing tip. A raked wing tip conventionally has a higher degree of sweep than the rest of the wing. Winglets are also an alternative solution, generally used to increase the effective aspect ratio of a wing, with less structural impact than adding wingspan. Winglets are generally near vertical extensions of the wing tip. Wing tip devices may increase the lift generated at the wing tip, and reduce the induced drag caused by wingtip vortices, improving the lift-to-drag ratio.

Various wing tip devices and geometries are described, for example, in U.S. Pat. No. 7,971,832 (titled "Wing Tip Devices," issued Jul. 5, 2011), U.S. Pat. Pub. No. 2007/0114327 (titled "Wing Load Alleviation Apparatus and Method," published May 24, 2007), U.S. Pat. No. 6,722,615 (titled "Wing Tip Extension for a Wing," issued Apr. 20, 2004), U.S. Pat. No. 6,827,314 (titled "Aircraft with Active Control of the Warping of Its Wings," issued Dec. 7, 2004), U.S. Pat. No. 6,886,778 (titled "Efficient Wing Tip Devices and Methods for Incorporating such Devices into Existing Wing Designs," issued May 3, 2005), U.S. Pat. No. 6,484,968 (titled "Aircraft with Elliptical Winglets," issued Nov. 26, 2002), U.S. Pat. No. 5,348,253 (titled "Blended Winglet," issued Sep. 20, 1994), each of which is incorporated by reference into this application as if fully set forth herein.

SUMMARY

Embodiments described herein may be applied to a wing incorporating a tip device with a curved leading edge and a curved trailing edge to minimize induced drag for a given wing form. The curved leading edge is designed to achieve optimal results such as, for example, maintaining attached flow, minimizing flow separation, and minimizing premature vortex roll-up, while the curved trailing edge is designed to achieve optimal results such as, for example, keeping the chord distribution consistent with an elliptic loading over the planform. The curve of the leading and trailing tip sections may be described generally as parabolic, and preferably as super elliptic. A finite tip segment may be included with a sweep angle approximate to the trailing edge sweep angle. This finite section may be used to assist in stabilizing the tip vorticity and maintain the vortex position close to the extreme wing tip.

Aerodynamic loading may be important to achieving optimum wing performance; however, the effect of the actual loading obtained in flight at a wing tip is usually overlooked. Failure to achieve the optimum elliptic loading, particularly near the tip of the wing, may lead to premature tip vortex formation and a corresponding increase of induced drag. This characteristic may also apply to planar wings where premature tip vortex roll-up, inboard of the wing tip, is frequently visible as a condensation trail in flight.

Embodiments described herein may be applied to the tip of a flat wing or to a winglet. However, aspects of the design may be applied to lifting surfaces in general, and particularly to dynamic lifting surfaces. Alternatively, aeronautical propulsion systems, including, for example, propellers and helicopters rotors, may alternatively benefit equally from aspects of the design and are additionally considered within the scope of the invention. Embodiments described herein may also apply to any applications which use either static or dynamic lifting surfaces such as ship propellers.

DETAILED DESCRIPTION

The following description should be read with reference to the drawings, in which like elements in different drawings are identically numbered. The drawings, which are not necessarily to scale, depict selected embodiments and are not intended to limit the scope of the invention. For instance, edges appearing be pointed in the drawings may in actuality be rounded (e.g., leading edges in FIGS. 2B, FIG. 3, FIG. 4B, and FIG. 5). The description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. Embodiments described herein include an optimum wing tip geometry for wings. The described geometry may reduce induced drag associated with premature tip vortex formation from suboptimum aerodynamic loading. Embodiments of the tip design geometry may preserve an elliptic load distribution to the tip of the wing. In addition, the airfoil sections may be cambered and twisted to avoid flow separation along the highly swept leading edge, thereby maintaining an elliptic loading to the extreme tip. Spanwise camber of the lifting surface may also be incorporated to maintain flow attachment and avoid premature roll-up of the tip vorticity.

Based on aerodynamic analysis of embodiments incorporating aspects of the design described herein, it has been shown that significant reductions of induced drag can be expected relative to that found in typical current tip designs. These results may depend upon the proper selection of parameters that define the tip geometry and are discussed below. The potential benefits may be expected in the range of about −1% to about −3% induced drag reduction for a commercial transport airplane configuration. The induced drag reduction may correspond to an increase in fuel efficiency in the range of about 0.7% to about 2% at normal cruising speeds. Additional benefits may be expected for low-speed operation.

Although embodiments of the invention are typically described in terms of wing tip devices, or winglets, the invention is not so limited. Aspects of the invention may be applied to lifting surfaces in general, and particularly to wings generally, and more particularly to aircraft, including planar wings without the use of winglets. Aeronautical propulsion systems, including, for example, propellers and helicopters, may alternatively benefit equally from aspects of the invention and are additionally considered within the scope of the invention. Embodiments of the present invention may also apply to any applications which use either static or dynamic lifting surfaces such as helicopters, ship propellers, etc. Finally, other applications that may benefit from aspects of the invention include devices intended to move air or fluid, such as fans.

Figure 1:
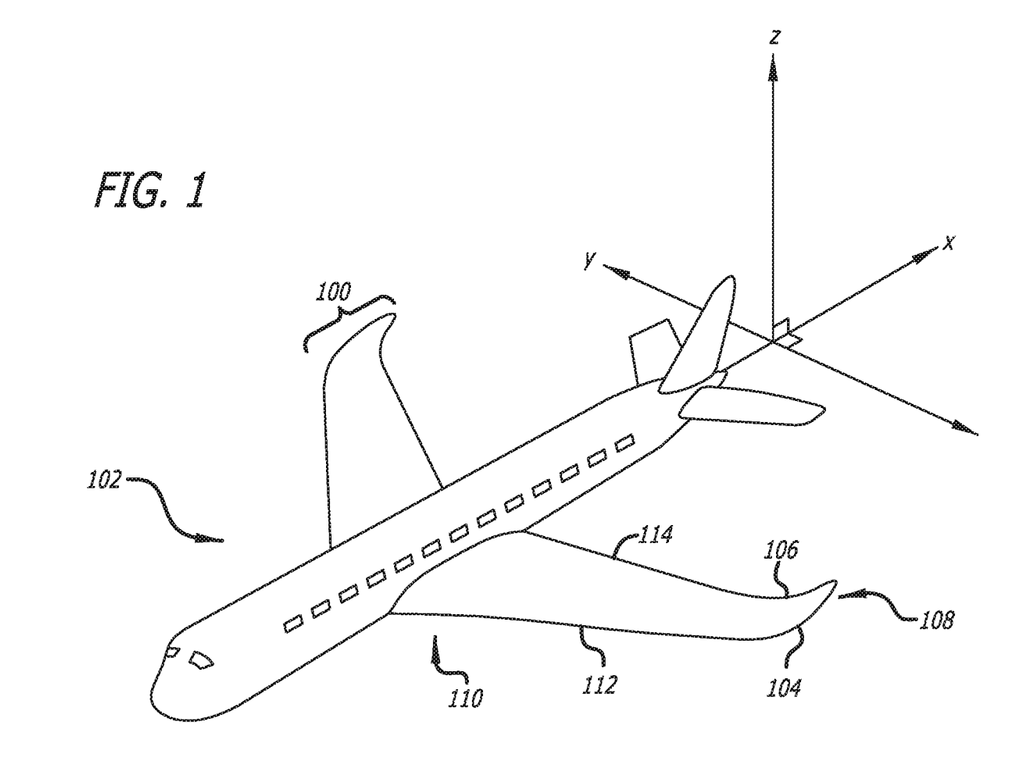
FIG. 1 is a perspective view of an exemplary airplane including wing tip geometry according to embodiments described herein.

Reference axes are used generally to orient the description, as known in the art, and therefore include a reference system for the airplane generally, a reference system for the wing of the airplane, and finally a reference system for the wing tip device. As seen in FIG. 1, an airplane reference system is used to orient the description with respect to the aircraft generally. The x-axis runs along the longitudinal axis of the airplane from nose to the tail. The y-axis is perpendicular to the x-axis and emanates horizontally from the airplane. Finally, the z-axis is orthogonal to both the x and y axes, oriented in the vertical direction. A wing reference system may also be used which may differ from the airplane reference system, as it lies in the reference plane of the wing. Therefore, as seen in FIGS. 3 and 5, the reference system may be rotated by the incidence angle, the dihedral angle, and the sweep angle. Finally, for embodiments described herein, as seen in FIGS. 2 and 4, the origin of the reference system for the wing tip geometry is coincident with the start of the wing tip geometry and lies generally in the plane of the wing, at the wing tip. However, this relationship may change substantially from the wing reference system in cases of winglet applications (e.g., see FIG. 6). The wing tip device reference system has its origin at the edge of the wing tip device, the beginning of the curved leading edge, or curved trailing edge, whichever is closest to the airplane. The x'-y' axis is then in the plane of the wing at the origin of the wing tip. Therefore, the wing tip geometry may be rotated from the airplane reference system by the sweep angle, dihedral angle, incidence angle, and winglet angle, and displaced from the airplane reference system by the length of the wing to the wing tip.

FIG. 1 illustrates an exemplary airplane 102 including a wing tip section 100 according to embodiments described herein. The wing tip section 100 may be designed to minimize induced drag by preserving an elliptic load distribution. The leading edge 104 of the wing tip section 100 may be curved to avoid flow separation. The trailing edge 106 of the wing tip section 100 may be curved to maintain a desired chord variation. The trailing edge tip segment 108 may have a small but finite dimension and sweep. The tip segment 108 may be swept at approximately the same or similar angle as the trailing edge sweep angle. This tip segment 108 may assist to stabilize the tip vorticity and maintain its position at the trailing edge.

Wing 110 has a leading edge 112 and a trailing edge 114. The leading edge 112 may be substantially straight, and may transition into the curved leading edge 104 of the wing tip 100. The trailing edge 114 may be substantially straight before transitioning into the curved trailing section 106 of the wing tip 100. The leading edge 112 and trailing edge 114 may also be swept. However, the leading edge 112 and trailing edge 114 may be swept at different angles. For example, the leading edge 112 may have a greater sweep angle than the trailing edge 114.

Figure 2A:
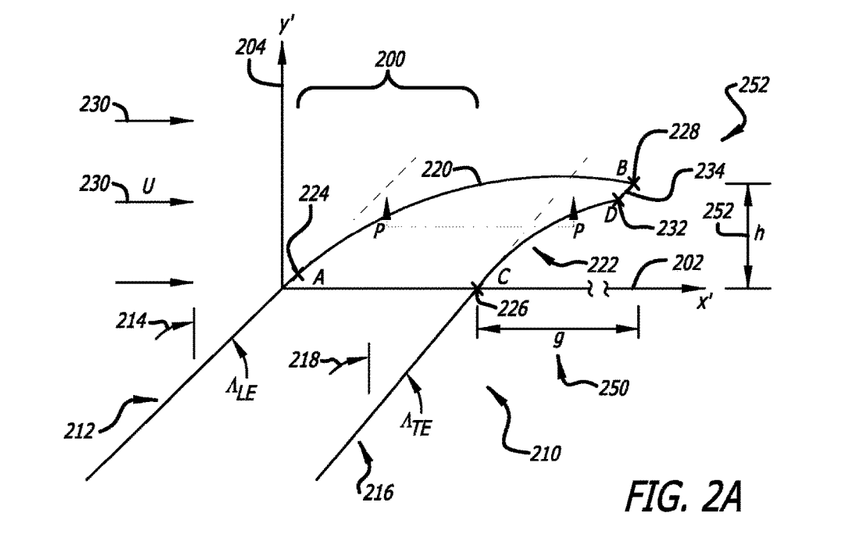
FIG. 2A is an enlarged top view of an exemplary wing tip according to aspects of the embodiments described herein.
Figure 3:
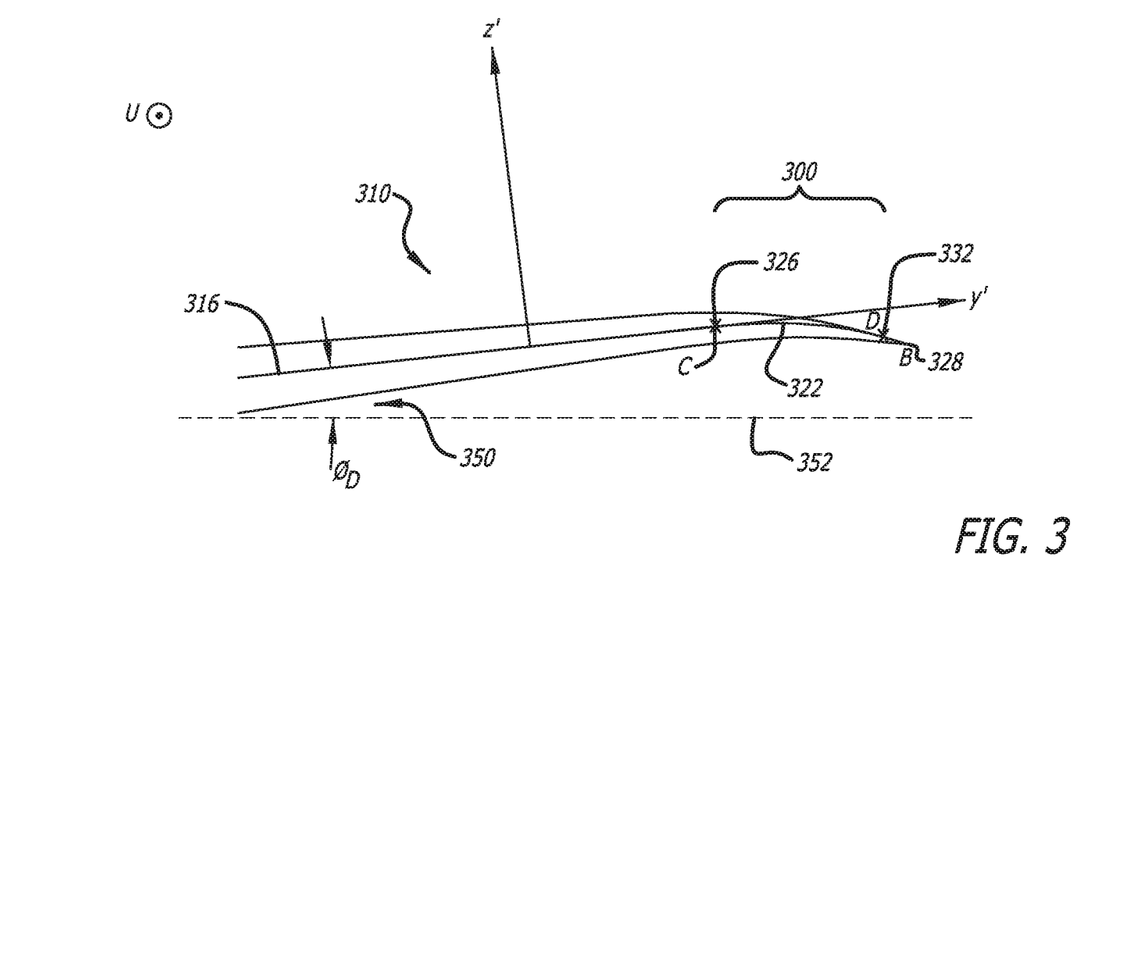
FIG. 3 is an enlarged trailing-edge perspective view of an exemplary wing tip according to embodiments described herein, including a spanwise camber.

FIG. 2A is a top view that illustrates an exemplary wing tip geometry 200 according to embodiments described herein. An x'-y' reference system for the wing tip geometry 200 may be created by a line parallel 202 and another perpendicular 204 to the longitudinal axis of the airplane body. This x'-y' reference plane is within the plane of the wing 210. In one embodiment, the wing 210 is not perpendicular to the plane body, but is swept backwards towards the rear of the airplane. The wing 210 may also be rotated upward at a dihedral angle, or tilted about a pitch axis of the airplane to create an incidence angle. For example, the leading edge 212 may be swept at an angle, ALE, 214, measured from the y'-reference axis 204. The trailing edge 216 may also be swept at an angle, ATE, 218, also measured from the y'-reference axis 204. The sweep angle of the leading edge 214 and the trailing edge 218 may be at the same angle or different angles. Preferably, the sweep angle of the leading edge 214 is greater than the sweep angle of the trailing edge 218.

In one embodiment, the tip of the wing 210 has a wing tip geometry 200 that curves aft. The wing tip geometry 200 begins along the leading edge at point 224 and along the trailing edge at point 226. These starting locations do not necessarily have to be at the same distance away from the airplane body. For example, the transition to the curved trailing edge 222 may begin closer to the airplane body than for the curved leading edge 220. The curved leading edge 220 and the curved trailing edge 222 begin tangential with the leading edge 212 and the trailing edge 216, respectively, and then curve rearward. The curved leading edge 220 and curved trailing edge 222 transition smoothly from the substantially straight leading edge 212 and trailing edge 216, respectively, and then slopes rearward along a parabolic curve approaching the freestream velocity direction U 230. Preferably, the curved leading edge 220 may be closer to approaching the direction of the freestream velocity U 230 at the leading edge tip 228, than the curved trailing edge 222 does at the trailing edge tip 232.

In one embodiment, an end segment 234, between the leading edge tip 228 and the trailing edge tip 232, may be located aft of the curved trailing edge 222. This segment 234 may have a specified length and may be swept at an angle close to or equal to the wing trailing edge sweep angle 218. The preferred length of BD 234 is in the range of 0.15<BD/h<0.20 with the ratio tending higher at higher values of tip lift coefficients. It is believed that a segment such as BD 234 is advantageous to stabilize the tip vortex.

The wing tip section 200 may be applied to a conventional flat wing where the curved leading edge 220 and the curved trailing edge 222 may lie in the wing reference plane, i.e., the x'-y' plane. Therefore, the entire wing, emanating from the plane and terminating at end segment 234, are substantially in the same plane. In an alternate embodiment, the wing tip section 200 may be applied to a conventional winglet, where the wing end projects out of the x'-y' reference plane, in the z'-direction. The wing tip section 200 may be integrally formed with the rest of the wing 210, or may be a separate section attached or adhered to the tip of the wing. The wing tip section may be attached by bolting, welding, or other known practices of attaching wing segments.

Figure 2B:
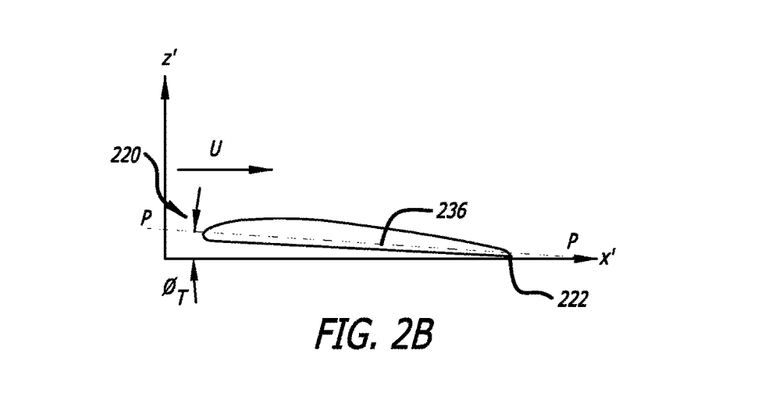
FIG. 2B is a cross-sectional view of the wing tip of FIG. 2A, taken along line P-P.

FIG. 2B is a cross-sectional view of the wing tip section 200, at reference P-P of FIG. 2A. A chord, represented by dotted line 236, is the line from the curved leading edge 220 to the curved trailing edge 222, which may be at an angle OT relative to the x'-reference line 202. The chord distribution conforms to the optimum aerodynamic loading on the wing surface. In one embodiment, the curved trailing edge 222 is designed to maintain a desired chord distribution to achieve elliptic loading. Airfoil sections may also be incorporated at specified locations, y', corresponding to the local chord line and the twist angle $\theta_T$ distribution.

These features may be alternatively described in mathematical terms, where all dimensions may be normalized relative to the tip extension length, g 250. The tip extension length, g 250 is the straight-line distance of the trailing edge that extends past the trailing edge origin of the wing tip geometry. Therefore, this distance is the x'-direction difference between the origin of the wing tip along the trailing edge 226 and the very end 228 of the curved leading edge 220. Another reference length h 252 is provided corresponding to the height of the extension length, and is the y'-distance from the curved wing tip section 200 origin along the trailing edge, point 226, to the trailing edge end point 232. Points A, B, C, D, and E are added for reference locations. Point A 224 is the point where the leading edge 212 transitions into the curved leading edge 220, and deviates from the line tangential with the leading edge 212. Reference point C 226 is the corresponding point along the trailing edge 216. Point B 228 is the end of the curved leading edge 220, while point D 232 is the end of the curved trailing edge 222. The segment BD is the end segment 234.

The curved leading edge 220, from point A to C, may be defined by:

$$x-x_A=\tan \Lambda_{LE}*(y-y_A)+M_1*(y-y_A)^{m_1}+M_2*(y-y_A)^{m_2}.$$

In one embodiment, the curved leading edge parameters $M_1$ and $m_1$, $M_2$ and $m_2$ are selected to define a planform that may maintain attached flow and avoid flow separation. The parameters are therefore chosen to create a smooth parabolic transition from the substantially straight leading edge 212 to the desired end slope at point B 228. The desired leading edge slope, dy/dx, at point B approaches the freestream direction U 230 and may be in the range of about 0.0 to about 0.1, and is preferably in the range about 0.03 to about 0.07. In one embodiment, the desired leading edge slope approaches about 0.05. To provide optimal performance characteristics, where $x_A$, $y_A$, g, and $\Lambda LE$ are given, $M_1$ is in the range of about 0.4 to about 0.6, $M_2$ is in the range of about 0.08 to about 0.12, $m_1$ is in the range of about 3.6 to about 5.4, and $m_2$ is in the range of about 5.2 to about 7.7. Preferably, $M_1$ is about 0.5, $M_2$ is about 0.1, mi is about 4.5, and $m_2$ is about 6.5. The inclusion of two power terms is preferred to sufficiently provide control of the leading edge slope, dy/dx at point B and to match the optimum leading edge curve shape. The design includes at least one power term to create the smooth parabolic transition from the leading edge to the end point. However, power terms may be removed or added to further approach the optimum performance.

The curved trailing edge 222, from point C to D, may be defined by:

$$x-x_C=\tan \Lambda_{TE}*(y-y_C)+N_1*(y-y_C)^{n_1}+N_2*(y-y_C)^{n_2}.$$

In one embodiment, the curved trailing edge parameters $N_1$ and $n_1$, $N_2$ and $n_2$ are selected to maintain an appropriate chord variation and control of the trailing edge slope, dy/dx, approaching point D. The parameters are chosen to provide a smooth parabolic transition from the substantially straight trailing edge to achieve elliptic loading over the wing tip form. The parameters may additionally be chosen to control the trailing edge slope at point D to approach the freestream direction. For example, the trailing edge slope at point D may fall within the range of about 0.0 to about 2.0. In one embodiment, the trailing edge slope approaching point D is in the range of about 0.06 to about 0.15, and is preferably about 0.10. To provide optimal performance characteristics, where $x_C$, $y_C$, segment BD, h, and $\Lambda_{TE}$ are given, $N_1$ is in the range of about 0.08 to about 0.12, $N_2$ is in the range of about 0.16 to about 0.24, $n_1$ is in the range of about 2.8 to about 4.2, and $n_2$ is in the range of about 3.6 to about 5.4. More particularly, $N_1$ is about 0.1, $N_2$ is about 0.2, $n_1$ is about 3.5, and $n_2$ is about 4.5. The inclusion of two power terms are preferred to sufficiently control the loading on the wing tip and maintain an appropriate chord variation. However, fewer or additional power terms may be removed or added to more particularly control these features. At least one power term should remain to achieve the parabolic transition from trailing edge to tip.

The end segment BD, may have a small but finite dimension and may be swept at an angle approximate to the trailing edge angle, $\Lambda_{TE}$, 218. This section may assist in stabilizing the tip vorticity and maintain the vortex position very close to the extreme tip, at point B. The length of segment BD may be determined from the other parameters already described.

The airfoil sections may be cambered or twisted to maintain an elliptic loading to the wing tip and avoid flow separation along the curved leading edge 220. The wing chord, the reference line between the curved leading edge 220 and the curved trailing edge 222, may be designed according to the parameters above to maintain the desired chord distribution. The airfoil may additionally be twisted, thereby angling the chord relative to the free stream direction OT. Airfoil twist may be defined by the rotation angle of the airfoil chord about the tip trailing edge, CDB, relative to the wing reference plane, x'-y' plane. In alternate embodiments, the airfoil shapes may be modified versions of the basic winglet airfoil.

FIG. 3 is a profile view of the wing 310 from the trailing edge, illustrating a representative wing tip section 300 according to aspects of the embodiments described herein, including a spanwise camber. The spanwise camber may be generated by displacement in the z'-direction, of the wing tip section 300 curved trailing edge 322 from the wing reference plane, x'-y'. In one embodiment, this curve, lying in the y'-z' plane, emanates tangentially from the wing trailing edge 316 at point 326 and deviates parabolically to terminate at trailing edge end point 332. Therefore, the end of the wing tip section 300 curves out of the x'-y' reference plane starting at the origin of the curved trailing edge 322 at point 326. The path of the trailing edge out of the reference plane, which is generally parabolic in the y'-z' plane, generates a wing tip surface that may be substantially cylindrical until the trailing edge terminates at point 332. In another embodiment, the spanwise camber creates part of a cylindrical surface, which may be augmented by superposition of airfoil camber and twist.

The representative profile of a wing according to aspects of embodiments described herein, including a spanwise camber, may alternatively be described in mathematical terms. The wing may include a slight incline $\theta_D$, the dihedral angle 350, from horizontal 352, as the wing approaches the wing tip section 300. In one embodiment, the wing tip section 300 may also, or alternatively incorporate a spanwise camber to maintain flow attachment, reduce flow separation, and minimize premature roll-up along the outer edge of the tip design.

The camber may be defined in terms of vertical displacement, z, of the curved trailing edge CD from a straight line extension of the wing trailing edge, y'-axis, and may be defined by:

$$z-z_C = -P^*(y-y_C)^p,$$

where $y_C \leq y \leq y_D$.

In one embodiment, the parameters P and p, are selected in combination with the wing incline and twist to define the lifting surface between the previously defined curved leading and curved trailing edges. To provide optimal performance characteristics, where $x_C$, $y_C$, segment BD, h, and $\Lambda_{TE}$, are given, P is in the range of about 0.12 to about 0.18, and p is in the range of about 2.0 to about 3.0. Preferably, P is about 0.15, and p is about 2.5. Alternatively, the design may include the wing tip section 300 curved in the opposite direction, or in the positive z direction, according to the same principles.

The above combination of parameters to maintain the elliptic loading and attached flow to the tip may be defined in relation to the wing planform (i.e., sweep and taper) and aerodynamic loading. The design parameters may be specified within appropriate limits to provide optimal performance characteristics.

Figure 4A:
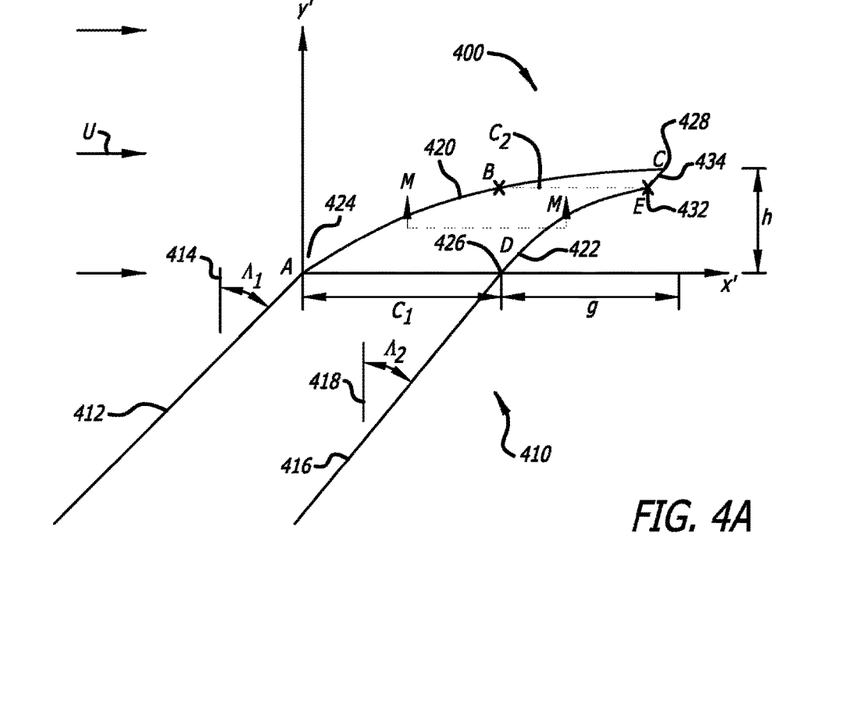
FIG. 4A is an enlarged top view of another exemplary wing tip according to aspects of the embodiments described herein.
Figure 5:
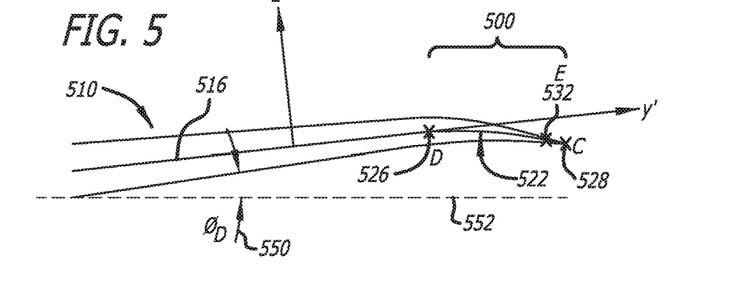
FIG. 5 is an enlarged trailing-edge perspective view of an exemplary wing tip according to embodiments described herein, including a spanwise camber.

FIG. 4A represents an alternate embodiment and illustrates a top view of a wing 410, including a wing tip section 400 according to embodiments described herein. The wing 410 includes a substantially straight leading edge 412, swept rearward at an angle $\Lambda_1$ 414 and a trailing edge 416, which is also substantially straight and swept rearward at an angle $\Lambda_2$ 418.

In one embodiment, the wing tip section 400 starts at point 424 along the leading edge 412, and point 426 along the trailing edge 416. The starting points 424 and 426 may occur at the same distance away from the airplane body, as shown, or may occur at different distances. For example, the transition point 424 may occur as shown, but the transition along the trailing edge 416 may be further away from the airplane body. The wing tip section 400 includes a curved leading edge 420 and curved trailing edge 422. The curved leading edge 420 emanates from a line tangential with the leading edge 412 and smoothly transitions along an elliptical curve to an endpoint 428, where the slope approaching point 428 approaches the freestream direction U. Similarly, the curved trailing edge 422 emanates tangentially from the trailing edge 416 and curves rearward along an elliptic curve to an endpoint 432, where the slope approaching the end point 432 also approaches the freestream direction U. The slope approaching the wing tip is not necessarily the same along the curved leading edge 420 and the curved trailing edge 422.

In one embodiment, an end segment 434, between the leading edge tip 428 and the trailing edge tip 432, may be located aft of the curved trailing edge 422. This segment 434 may have a specified length and may be swept at an angle close to or equal to the wing trailing edge sweep angle 418. The preferred length of CE 434 is in the range of $0.15 < CE/h < 0.20$ with the ratio tending higher at higher values of tip lift coefficients. It is believed that a segment such as CE 434 is advantageous to stabilize the tip vortex.

This embodiment may also be described in mathematical terms to define an optimum design that maintains attached flow and avoids premature vortex roll-up. Points A, B, C, D, and E along with lengths $c_1$, $c_2$, g, and h have been included for reference. Point A 424 and D 426, are the origin of the curved end section 400 along the leading edge 412 and trailing edge 416 respectively. Points C 428 and E 432 are the respective end tip locations of the curved leading edge 420 and curved trailing edge 422, respectively. Point B is the point along the curved leading edge 420 corresponding to the same y'-distance as point E of the curved trailing edge 422. Reference length $c_1$ is the distance along the x'-direction between reference points A and D; while reference length $c_2$ is the distance along the x'-direction between points B and E. Reference height h is the y'-direction distance from the origin along the trailing edge, point D, to the curved wing tip extreme end, point C. Reference distance g is the x'-direction distance from the same origin as the h reference distance, point D, to the curved leading edge end point C.

The leading curved edge 420, from point A to C, may be defined by:

$$x-x_A = [y-y_A]^* \tan \Lambda_1 + a_1^*[(1-([y-y_A]/b_1)^{n_1})^{(1/m_1)}-1].$$

In one embodiment, the curved leading edge geometry parameters $a_1$, $b_1$, $m_1$, and $n_1$ are selected to define a planform that maintains attached flow and reduces flow separation, while minimizing premature vortex roll up. The inclusion of these four parameters are sufficient to provide control of the leading edge curvature near point A, and the contour slope at point C, to define the optimum leading edge contour. Additional terms may, however, be added or removed to further refine the optimum parameters.

The sizing parameters $(g/c_1)$, $(h/c_1)$, $(dy/dx)_c$, and $(c_2/c_1)$ relate to overall planform proportions and provide the framework for the optimum contours for both leading edge and trailing edge. To provide acceptable performance levels, $(g/c_1)$ is in the range of about 0.50 to about 0.80, $(h/c_1)$ is in the range of about 0.60 to about 1.00, $(dy/dx)_c$ is in the range of about 0.03 to about 0.07, and $(c_2/c_1)$ is in the range of about 0.60 to about 0.70. In one embodiment, $(g/c_1)$ is about 0.60, $(h/c_1)$ is about 0.70, $(dy/dx)_c$ is about 0.05, and $(c_2/c_1)$ is about 0.65.

The leading edge contour parameters $(a_1/c_1)$, $(b_1/c_1)$, $m_1$, and $n_1$ define the leading edge contour within the sizing framework. To provide acceptable performance levels, $(a_1/c_1)$ is in the range of about 1.50 to about 2.50, $(b_1/c_1)$ is in the range of about 0.60 to about 0.90, $m_1$ is in the range of about 2.0 to about 4.0, and $n_1$ is in the range of about 1.50 to about 3.0. In one embodiment, $(a_1/c_1)$ is about 2.0, $(b_1/c_1)$ is about 0.70, $m_1$ is about 3.0, and $n_1$ is about 2.0.

The curved trailing edge 422, from point C to E, may be defined by:

$$x-x_D = y^* \tan \Lambda_2 + a_2^*[(1-([y-y_D]/b_2)^{n2})^{(1/m2)} - 1].$$

In one embodiment, to provide optimal performance characteristics, the trailing edge curvature near point D and the contour slope at point E are defined to achieve the chord distribution consistent with an elliptic loading over the planform to minimize drag.

The sizing parameters $(g/c_1)$, $(h/c_1)$, $(dy/dx)_E$, and $(c_2/c_1)$ relate to overall planform proportions and provide the framework for the optimum contours for both leading edge and trailing edge. These sizing parameters, with the exception of $(dy/dx)_E$, have been previously selected, as discussed above in terms of the curved leading edge geometry. Sizing parameter $(dy/dx)_E$ is acceptable within the range of about 0.06 to about 0.15, and is preferably about 0.10. Therefore, contour parameters, $(a_2/c_1)$, $(b_2/c_1)$, $m_2$, and $n_2$ remain to be selected. The trailing edge contour parameters $(a_2/c_1)$, $(b_2/c_1)$, $m_2$, and $n_2$ define the trailing edge contour within the sizing framework. To provide acceptable performance levels, $(a_2/c_1)$ is in the range of about 0.80 to about 1.50, $(b_2/c_1)$ is in the range of about 0.30 to about 0.60, $m_2$ is in the range of about 1.50 to about 2.50, and $n_2$ is in the range of about 1.50 to about 2.50. In one embodiment, $(a_2/c_1)$ is about 1.0, $(b_2/c_1)$ is about 0.40, $m_2$ is about 2.0, and $n_2$ is about 2.0.

In one embodiment, the end section, segment CE, has a small but finite dimension and may be swept at the trailing edge angle $\Lambda_2$. This section may assist in stabilizing the tip vorticity and maintain the vortex position close to the extreme tip, point E. The length of segment CE is determined by sizing and contour parameters.

Figure 4B:
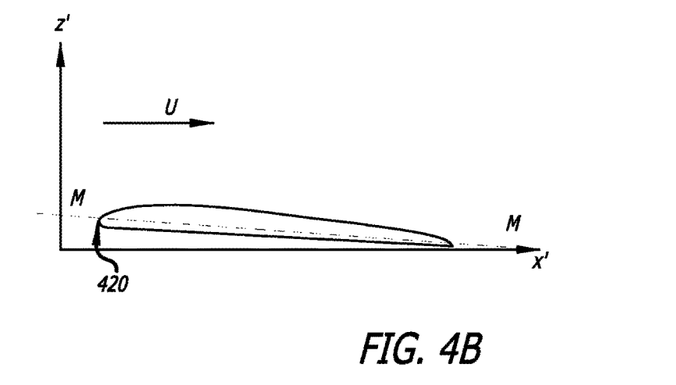
FIG. 4B is a cross-sectional view of the wing tip of FIG. 4A, taken along line M-M.

FIG. 4B illustrates a representative cut-away airfoil section M-M from FIG. 4A. The airfoil section may be cambered and twisted to maintain an elliptic loading to the extreme tip and avoid flow separation along the highly swept curved leading edge 420. Airfoil twist may be defined by the rotation angle of the airfoil chord about the tip trailing edge, CED, relative to the wing reference plane, x'-y'. Airfoil shapes may also be modified versions of the basic winglet airfoil.

FIG. 5 illustrates a representative profile of a wing 510, as seen looking toward the trailing edge 516, according to aspects of the design including a representative spanwise camber. The wing may include a slight incline, the dihedral angle, $\theta_D$, 550, from horizontal 552, as the wing approaches the curved tip section 500. In one embodiment, the wing tip geometry 500 may also, or alternatively, incorporate spanwise camber of the wing lifting surface to maintain flow attachment, reduce flow separation, and minimize premature roll-up along the outer edge of the tip design.

The camber may be defined in terms of lateral displacement, z, of the curved trailing edge 522, CD, from a straight line extension of the wing trailing edge 516, and may be defined by:

$$z/c_1 = -P^*([y-y_D]/h-1)^p.$$

In one embodiment, the parameters P and p are selected in combination with the airfoil camber and twist and define the lifting surface between the previously defined curved leading and curved trailing edges. To provide optimal performance characteristics, where the sizing parameters are given as described above, P is in the range of about 0.10 to about 0.25, and p is in the range of about 2.0 to about 4.0. More particularly, P is about 0.15, and p is about 2.5. The spanwise camber may alternatively curve in the opposite, or positive z, direction.

The above combination of parameters to maintain the elliptic loading and attached flow to the ultimate tip may be defined in relation to the wing planform (i.e. sweep and taper) and aerodynamic loading. The design parameters may be specified within appropriate limits to provide optimal performance characteristics.

Figure 6A:
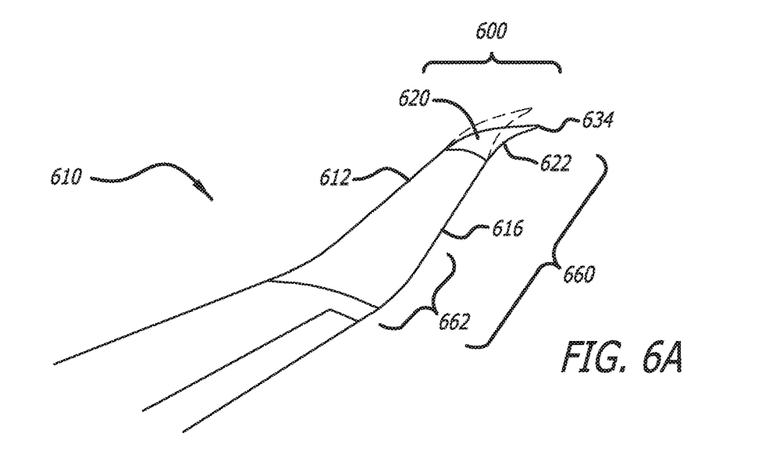
FIG. 6A is a perspective view of an exemplary winglet according to aspects of the embodiments described herein.

FIG. 6A illustrates a representative wing 610 with wing end section 600 according to embodiments described herein as applied to a winglet 660. The end of the wing may be turned upward in a winglet form 660, as illustrated more fully in FIG. 6B. The winglet 660 is attached to the end of the wing 610 and may be of any conventional design. For example, as shown, the winglet 660 transitions 662 out of the plane of the wing 610 in a vertical direction. The transition section 662 may be a continuous transition, as shown, such as along a constant radius, parabolic, or elliptic curve; the transition may alternatively be non-continuous. The end of the winglet 660, after the transition section 662, may be substantially straight. The wing 610 may be at an angle $\theta_D$ 650 from the horizontal 652. The leading edge 612 and trailing edge 616 may be substantially straight within the plane of the wing through the transition section 662 until the wing tip section 600. The leading edge 612 and trailing edge 616 merely transition in a vertical direction to form the winglet 660.

Figure 6B:
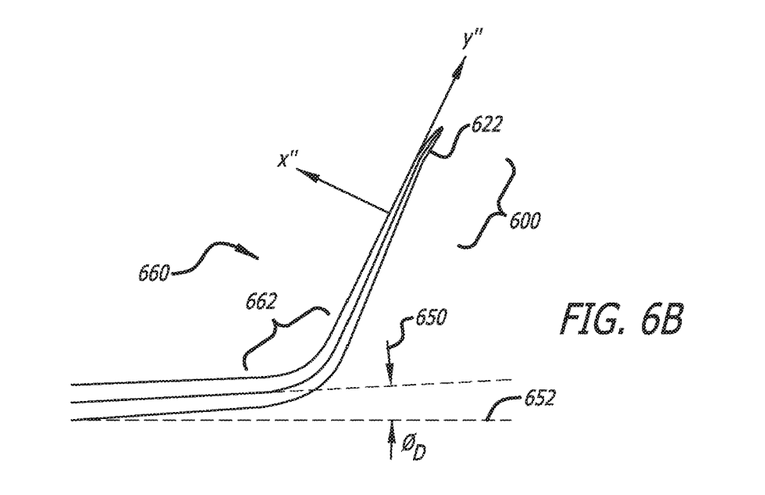
FIG. 6B is a trailing-edge perspective view of the winglet of FIG. 6A, including a spanwise camber.

The winglet 660 may include a curved leading edge 620, a curved trailing edge 622, and an end segment 634. The curved leading edge 620 deviates from the upward turned tangential of the leading edge 612, while the curved trailing edge 622 deviates from the upward turned tangential of the trailing edge 616. The curved leading edge 620 and curved trailing edge 622 may be parabolic or elliptic. The end segment 634 may also be designed according to embodiments described herein. The winglet 660 may also incorporate aspects of the design for the spanwise camber as shown in FIG. 6B. The curved end section 600 may not encompass the entire winglet 660, and preferably is only at the end of the winglet after the transition section 662.

Figure 7:
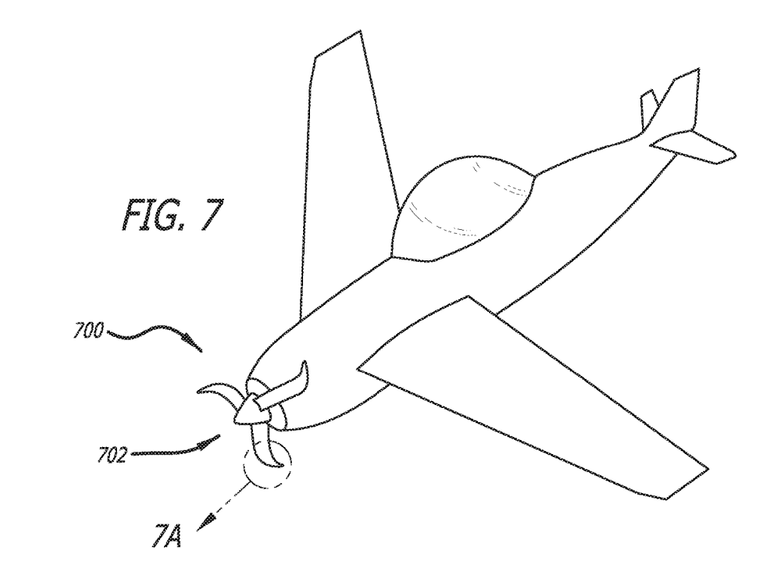
FIG. 7 is a perspective view of an airplane with exemplary propeller rotors according to embodiments described herein.
Figure 7A:
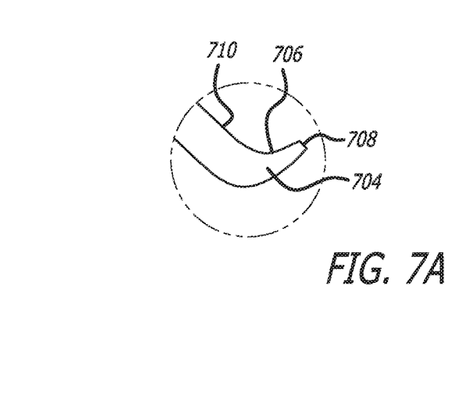
FIG. 7A is an enlarged view of a propeller blade tip of FIG. 7, according to embodiments described herein.

FIGS. 7-7A illustrate a representative airplane 700 including an exemplary propeller 702 according to embodiments described herein. The propeller tip geometry may include a curved leading edge 704, a curved trailing edge 706 with an end segment 708. The curved sections 704 and 706 transition smoothly from the propeller blade body 710. The curved leading edge 704 may be designed according to embodiments described herein. The curved leading edge 704 may be parabolic or elliptic and designed to maintain attached air flow and reduce flow separation. The curved trailing edge 706 may also be designed according to embodiments described herein, and may follow a parabolic or elliptic contour to maintain an appropriate chord variation and control the trailing edge slope at the tip of the propeller. The substantially straight sections 712 and 714 may be angled toward the trailing edge away from the radial projection of the propeller 702 center. End section 708 may connect the end of the curved leading edge 704 and the end of the curved trailing edge 706. The segment may be a finite dimension and angled to stabilize the tip vorticity and maintain the trailing vortex position at the tip. The design parameters for this application are essentially the same as for the cases previously illustrated. Similarly, embodiments described herein may be applied to duel propeller aircraft, where the propellers may be attached to the aircraft wings.

Figures 8, 8A:
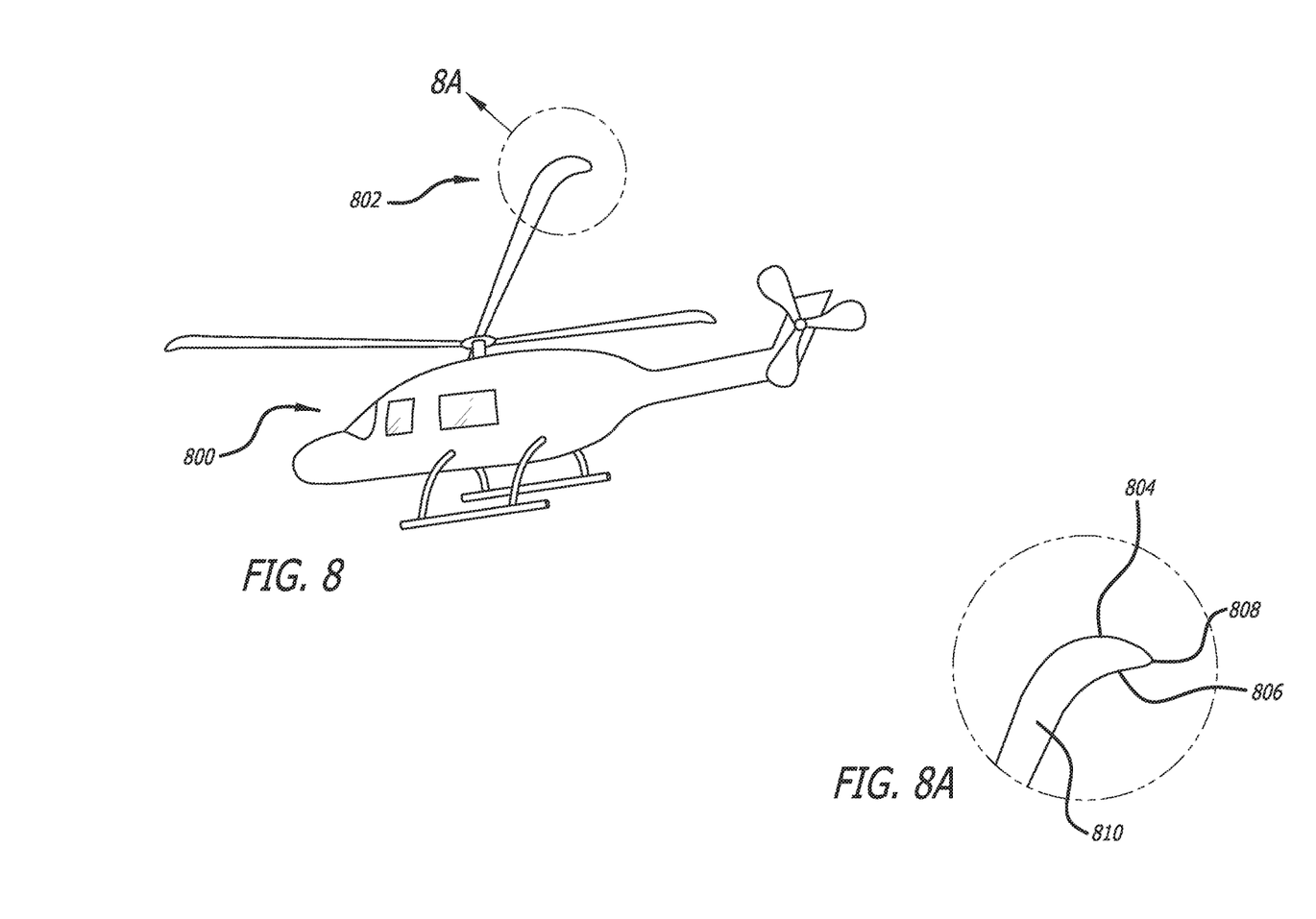
FIG. 8 is a perspective view of a helicopter with exemplary rotors according to embodiments described herein.
FIG. 8A is an enlarged view of a helicopter rotor tip of FIG. 8, according to embodiments described herein.

FIGS. 8-8A illustrate a representative helicopter 800 including an exemplary rotor 802 according to embodiments described herein. The rotor tip geometry may include a curved leading edge 804, a curved trailing edge 806, and an end segment 808. The curved sections 804 and 806 transition smoothly from the body of rotor 810. The curved leading edge 804 may be parabolic or elliptic and designed according to aspects of the above described disclosed embodiments to maintain attached air flow and reduce flow separation. The curved trailing edge 806 may also be parabolic or elliptic, but may be designed with different parameters according to aspects of the disclosed design to maintain an appropriate chord variation and control the trailing edge slope at the tip of the propeller. End segment 808 may connect the end of the curved leading edge 804 and the end of the curved trailing edge 806 according to aspects of the disclosed design. The segment may be a finite dimension and angled to stabilize the tip vorticity and maintain the trailing vortex position at the tip. The design parameters for this application are essentially the same as for the cases previously illustrated.

While the design has been described in terms of particular variations and illustrative figures, those of skill in the art will recognize that the design is not limited to the variations or figures described. Therefore, to the extent there are variations of the invention, which are within the spirit of the disclosure or equivalent to the inventions found in the claims, it is the intent that this patent will cover those variations as well. Variations contemplated within the scope of the invention include combinations of various features of the exemplary embodiments into new embodiments, as would be apparent to one skilled in the art. These equivalents may additionally include various applications, such as: water craft, other aircraft, or applications generally intended to move gas or liquid. For example, water craft including propellers, helicopters, and propeller airplanes are all understood to benefit from one or more embodiments described herein. Alternatively, fans, including ventilation systems, are also understood to benefit from one or more embodiments described herein. Finally, all patents, publications, and patent applications cited in this description are herein incorporated by reference in their entirety as if each individual publication or patent application were specifically and individually put forth herein.

What is claimed is:

1. A wing tip designed for attachment to a winglet of an aircraft, the winglet coupled to a wing of the aircraft and having a leading edge and a trailing edge continuously transitioning from a leading edge and trailing edge of the wing, the winglet transitioning vertically out of a plane of the wing, the wing tip comprising:

a curved leading edge from the winglet leading edge to a leading end point;

a curved trailing edge from the winglet trailing edge to a trailing end point; and an end segment connecting the leading end point and the trailing end point, the end segment swept back from the trailing end point to the leading end point at an end segment angle.

2. The wing tip according to claim 1, wherein the end segment angle is substantially equivalent to a sweep angle of the winglet trailing edge.

3. The wing tip according to claim 1, wherein the curved leading edge defines a first parabolic line, the first parabolic line approaching a freestream direction at the leading end point.

4. The wing tip according to claim 3, wherein the first parabolic line meets a criteria:

$$x-x_A=\tan \Lambda_{LE}*(y-y_A)+M_1*(y-y_A)^{m1}+M_2*(y-y_A)^{m2},$$

wherein $M_1$ is in a range from about 0.4 to about 0.6, $M_2$ is in a range from about 0.08 to about 0.12, $m_1$ is in a range from about 3.6 to about 5.4, and $m_2$ is in a range from about 5.2 to about 7.7.

5. The wing tip according to claim 3, wherein the curved trailing edge defines a second parabolic line, the second parabolic line approaching the freestream direction at the trailing end point.

6. The wing tip according to claim 5, wherein the second parabolic line meets a criteria:

$$x-x_C=\tan \Lambda_{TE}*(y-y_C)+N_1*(y-y_C)^{n1}+N_2*(y-y_C)^{n2},$$

wherein $N_1$ is in a range from about 0.08 to about 0.12, $N_2$ is in a range from about 0.16 to about 0.24, $n_1$ is in a range from about 2.8 to about 4.2, and $n_2$ is in a range from about 3.6 to about 5.4.

7. The wing tip according to claim 1, wherein the curved leading edge defines a first elliptic line, the first elliptic line approaching a freestream direction at the leading end point.

8. The wing tip according to claim 7, wherein the first elliptic line meets a criteria:

$$x-x_A=[y-y_A]*\tan \Lambda_1+a_1*[(1-([y-y_A]/b_1)^{n1})^{(1/m1)}-1],$$

wherein $(a_1/c_1)$ is in a range from about 1.50 to about 2.50, $(b_1/c_1)$ is in a range from about 0.60 to about 0.90, $m_1$ is in a range from about 2.0 to about 4.0, and $n_1$ is in a range from about 1.50 to about 3.0, wherein $c_1$ is a distance from the winglet leading edge to the winglet trailing edge.

9. The wing tip according to claim 7, wherein the curved trailing edge defines a second elliptic line, the second elliptic line approaching the freestream direction at the trailing end point.

10. The wing tip according to claim 9, wherein the second elliptic line meets a criteria:

$$x-x_D=y*\tan \Lambda_2+a_2*[(1-([y-y_D]/b_2)^{n2})^{(1/m2)}-1],$$

wherein $(a_2/c_1)$ is in a range from about 0.80 to about 1.50, $(b_2/c_1)$ is in a range from about 0.30 to about 0.60, $m_2$ is in a range from about 1.50 to about 2.50, and $n_2$ is in a range from about 1.50 to about 2.50.

11. The wing tip according to claim 1, the wing tip further comprising an airfoil chordwise camber and twist.

12. The wing tip according to claim 1, wherein a leading edge slope at the leading end point is in a range from about 0.03 to about 0.07, and a trailing edge slope at the trailing end point is in a range from about 0.06 to about 0.15.

* * * * *